US012705657B2

(12) United States Patent
Agrawal et al.

(10) Patent No.: US 12,705,657 B2
(45) Date of Patent: Aug. 11, 2026

(54) SYSTEMS AND METHODS FOR SELECTING AND PRESENTING PRODUCTS BASED ON PAST PURCHASES

(71) Applicant: COUPANG CORP., Seoul (KR)

(72) Inventors: Nishant Agrawal, Sunnyvale, CA (US); Ashutosh Pendse, Mountain View, CA (US); Chetan Rao, Fremont, CA (US)

(73) Assignee: Coupang Corp., Seoul (KR)

( * ) Notice: Subject to any disclaimer, the term of this patent is extended or adjusted under 35 U.S.C. 154(b) by 112 days.

(21) Appl. No.: 17/712,519

(22) Filed: Apr. 4, 2022

(65) Prior Publication Data

US 2023/0316369 A1 Oct. 5, 2023

(51) Int. Cl.
*G06Q 30/0601* (2023.01)

(52) U.S. Cl.
CPC ..... *G06Q 30/0627* (2013.01); *G06Q 30/0631* (2013.01)

(58) Field of Classification Search
None
See application file for complete search history.

(56) References Cited

U.S. PATENT DOCUMENTS 9,959,563 B1 * 5/2018 Wu .................... G06Q 30/0631
12,039,587 B2 * 7/2024 Iyer .................... G06Q 30/0641
2019/0236681 A1 * 8/2019 Konik ................. G06F 16/3325
2020/0394257 A1 * 12/2020 Santoso ............ G06F 16/90324
2021/0201351 A1 * 7/2021 Nag ......................... G06N 3/08
(Continued)

FOREIGN PATENT DOCUMENTS

KR 1020120082449 A 7/2012
KR 20210071096 A 6/2021

OTHER PUBLICATIONS

Author={Keping Bi and Choon Hui Teo and Yesh Dattatreya and Vijai Mohan and W. Bruce Croft}; title={Leverage Implicit Feedback for Context-aware Product Search}; year={2020}; eprint={1909.02065}, url={https://arxiv.org/abs/1909.02065}, (Year: 2020).*
(Continued)

*Primary Examiner* — Michelle T Kringen
(74) *Attorney, Agent, or Firm* — Finnegan, Henderson, Farabow, Garrett & Dunner, LLP

(57) ABSTRACT

Disclosed embodiments provide systems and methods for generating and presenting relevant product search results based on a user past purchase history. A method generating and presenting product search results based on past purchase history comprises retrieving a user product search query, a set of historical purchase data associated with the user, and a set of experimental data comprising a hierarchical list of product categories. The method further comprises determining a list of queried product categories based on a plurality of attributes and the pattern using machine learning algorithms. The method further comprises generating a hierarchical list of historical product categories associated with the user. The method further comprises generating a list of product search results associated with the user's product query. The method further comprises ranking the list of product search results based on the user's past purchase history and presenting the ranked list of product search results to the user.

20 Claims, 8 Drawing Sheets

(56) References Cited

U.S. PATENT DOCUMENTS

2021/0256367 A1 * 8/2021 Mor .................. G06Q 30/0282

OTHER PUBLICATIONS

Notice of Final Rejection from Korean Patent Application No. 10-2022-0125343 dated Sep. 19, 2025 (5 pages). Korean Patent Application No. 10-2022-0125343 is a counterpart application to U.S. Appl. No. 17/712,519.

Notice of Allowance from counterpart Korean Patent Application No. 10-2022-0125343 dated Apr. 16, 2026 (5 pages).

* cited by examiner

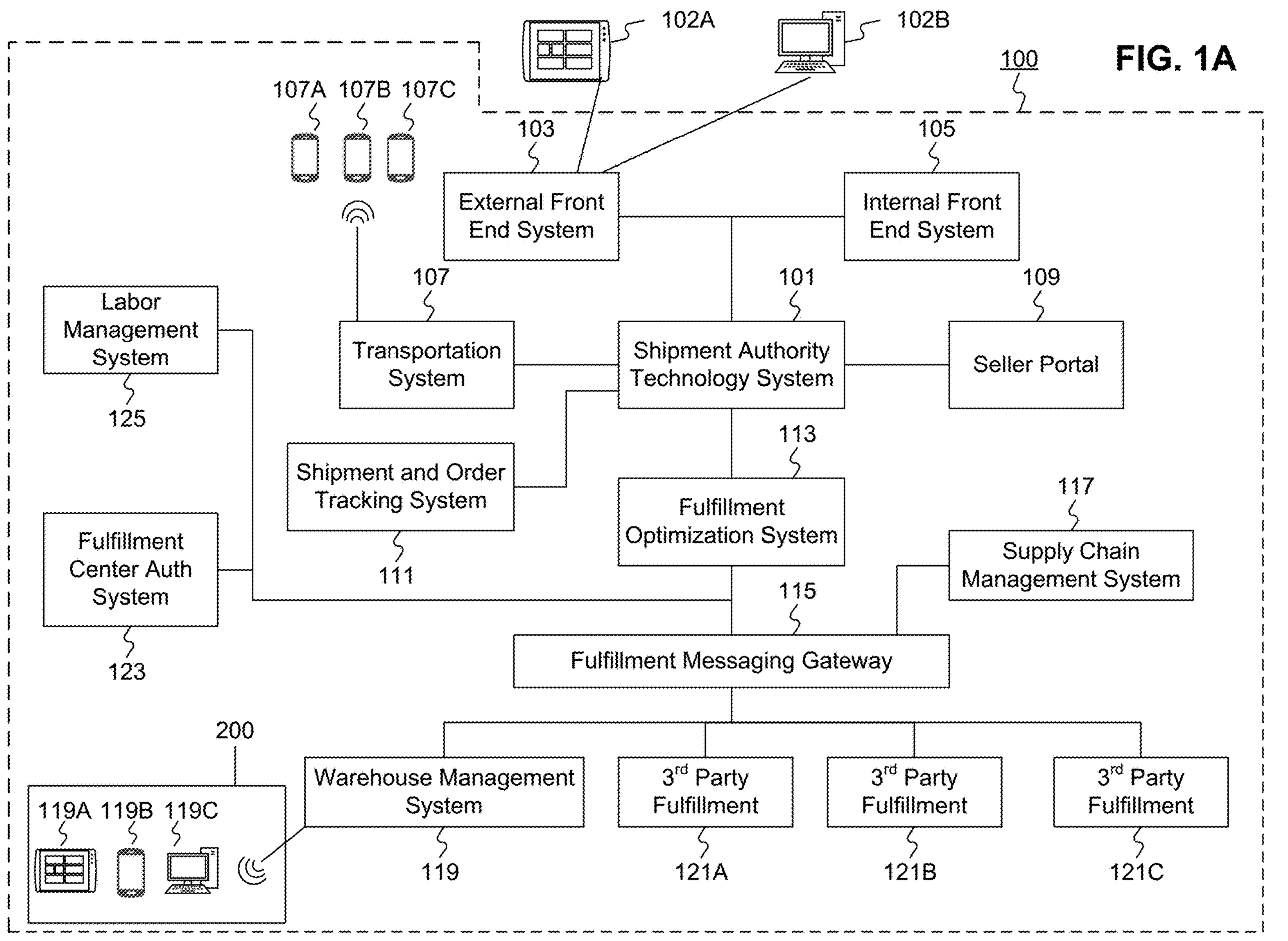
FIG. 1A
100
102A
102B
107A 107B 107C
103
External Front End System
105
Internal Front End System
107
Transportation System
101
Shipment Authority Technology System
109
Seller Portal
Labor Management System
125
Shipment and Order Tracking System
111
113
Fulfillment Optimization System
117
Supply Chain Management System
Fulfillment Center Auth System
123
115
Fulfillment Messaging Gateway
200
119A 119B 119C
Warehouse Management System
119
3rd Party Fulfillment
121A
3rd Party Fulfillment
121B
3rd Party Fulfillment
121C Order / Payment Shopping Cart> Order Payment> Order Completion Buyer Information name e-mail Mobile Phone Number 0123456789

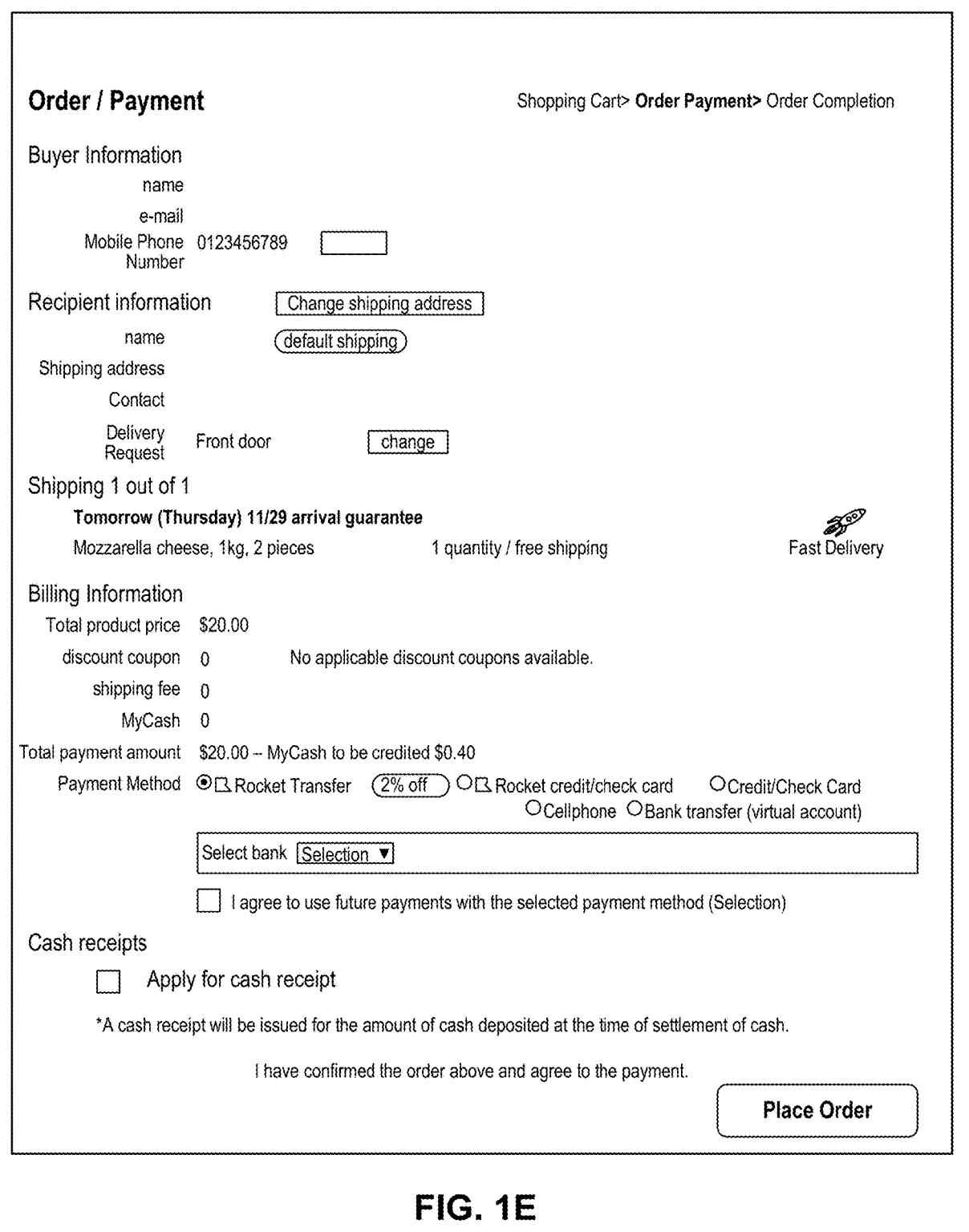

Recipient information [Change shipping address]

name (default shipping)

Shipping address

Contact

Delivery Request Front door [change]

Shipping 1 out of 1

Tomorrow (Thursday) 11/29 arrival guarantee

Mozzarella cheese, 1kg, 2 pieces 1 quantity / free shipping Fast Delivery

Billing Information

Total product price $20.00 discount coupon 0 No applicable discount coupons available.

shipping fee 0

MyCash 0

Total payment amount $20.00 – MyCash to be credited $0.40

Payment Method ◉ Rocket Transfer (2% off) ○ Rocket credit/check card ○ Credit/Check Card ○ Cellphone ○ Bank transfer (virtual account)

Select bank [Selection ▼]

☐ I agree to use future payments with the selected payment method (Selection)

Cash receipts

☐ Apply for cash receipt

*A cash receipt will be issued for the amount of cash deposited at the time of settlement of cash.

I have confirmed the order above and agree to the payment.

[Place Order]

FIG. 1E

SYSTEMS AND METHODS FOR SELECTING AND PRESENTING PRODUCTS BASED ON PAST PURCHASES

TECHNICAL FIELD

The present disclosure generally relates to computerized systems and methods for selecting and presenting products to users based on past purchases. In particular, embodiments of the present disclosure relate to inventive and unconventional systems relate to analyzing the intended search query of a user and the likely product categories, and selecting and presenting products based on the user's past purchases.

BACKGROUND

E-commerce platforms often deliver generally uniform search results to each user for a particular search string. A user that purchases a specific product (e.g., a particular type or brand of toothpaste) on a regular interval would generally have to search for that product anew every single time in order to make the purchase.

Product selection and presentation to the user in the prior art consists of generating a generally uniform list of product search based purely on the user's raw text input. First, this method of simplified string-matching often fails to accurately identify the product that is truly intended by the user in his search, and thus can lead to irrelevant or inappropriate products being selected and presented to the user. Second, the traditional type of product search is often performed in isolation, without contextualization of the product within a hierarchy of relevant product categories, thus failing to capture interconnections between products within the general product catalogue which could be useful in generating more meaningful product selections to the user. Third, the traditional product search often does not take into account salient attributes of the searched product, such as the frequency of repeated purchases for the product or the recency of the product's purchase by the user. This results in a failure to recognize or facilitate a user who simply intends to quickly repeat the purchase of a previously-purchased product, but instead, forces the user to manually traverse through an uniformly-presented, unranked list of products in order to find his product of choice. This inefficiency can unnecessarily burden or frustrate the user purchase experience.

Therefore, there is a need for improved methods and systems for analyzing the input data associated with the user query to identify the intended product for purchase, automatically extracting relevant attributes and patterns from the queried product, determining potential hierarchical product categories using machine learning and aggregated cross-user data, generating relevant product search results based on the user's past purchase history, and selecting and presenting products to the user based on past purchase history.

SUMMARY

One aspect of the present disclosure is directed to a system for generating and presenting product search results based on a user query. The computer-implemented system may include one or more memory storing instructions. The computer-implemented system may also include one or more processors configured to execute the instructions to perform operations. The operations may comprise retrieving, from at least one data structure, a product search query by the user, at least one set of historical purchase data associated with the user, and at least one set of experimental data comprising at least one hierarchical list of product categories. The operations may further comprise determining, using at least one machine-learning algorithm, a plurality of attributes associated with the product query, and at least one pattern associated with the plurality of attributes. The operations may further comprise generating, using at least one machine-learning algorithm, a list of queried product categories based on the plurality of attributes and the at least one pattern. The operations may further comprise generating, using the user's historical purchase data and the experimental data, a hierarchical list of historical product categories associated with the user. The operations may further comprise generating a list of product search results associated with the user's product query, based on the list of queried product categories and the list of historical product categories. The operations may further comprise ranking, using at least one machine-learning algorithm, the list of product search results based on a relevancy metric to the user's product query; and presenting the ranked list of product search results to the user.

Yet another aspect of the present disclosure is directed to a method for generating and presenting product search results based on a user query. The computer-implemented method may comprise retrieving, from at least one data structure, a product search query by the user, at least one set of historical purchase data associated with the user, and at least one set of experimental data comprising at least one hierarchical list of product categories. The method may further comprise determining, using at least one machine-learning algorithm, a plurality of attributes associated with the product query, and at least one pattern associated with the plurality of attributes. The methods may further comprise generating, using at least one machine-learning algorithm, a list of queried product categories based on the plurality of attributes and the at least one pattern. The methods may further comprise generating, using the user's historical purchase data and the experimental data, a hierarchical list of historical product categories associated with the user. The methods may further comprise generating a list of product search results associated with the user's product query, based on the list of queried product categories and the list of historical product categories. The methods may further comprise ranking, using at least one machine-learning algorithm, the list of product search results based on a relevancy metric to the user's product query; and presenting the ranked list of product search results to the user.

Yet another aspect of the present disclosure is directed to a system for generating and presenting product search results based on a user query. The computer-implemented system may include one or more memory storing instructions. The system may include one or more of processors configured to execute the instructions to perform operations. The operations may comprise retrieving, from at least one data structure, a product search query by the user comprising a text string, at least one set of historical purchase data associated with the user, and at least one set of experimental data comprising at least one hierarchical list of product categories collected from an aggregated set of users. The operations may further comprise standardizing the product search query by applying natural language processing algorithms. The operations may further comprise determining a history of prior access by the system for the historical purchase data associated with the user, and, upon determining that there is no history of prior access, storing the historical purchase data associated with the user in a cache memory. The operations may further comprise determining, using at least one machine-learning algorithm, a plurality of attributes associated with the product query comprising at least a product name, a price, and a quantity, and at least one pattern associated with the plurality of attributes. The operations may further comprise generating, using at least one machine-learning algorithm, a list of queried product categories based on the plurality of attributes and the at least one pattern. The operations may further comprise generating, using the user's historical purchase data and the experimental data, a hierarchical list of historical product categories associated with the user. The operations may further comprise ranking the hierarchical list of historical product categories based on the frequency of the user's past purchases of items within each category. The operations may further comprise generating a list of product search results associated with the user's product query, based on the list of queried product categories and the list of historical product categories. The operations may further comprise ranking, using at least one machine-learning algorithm, the list of product search results based on a relevancy metric to the user's product query, wherein the relevancy metric is at least based on the user's frequency of past purchases or state of recency; and presenting the ranked list of product search results to the user.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

FIG. 1E depicts a sample Order page that includes items from the virtual shopping cart along with information regarding purchase and shipping, along with interactive user interface elements, consistent with the disclosed embodiments.

DETAILED DESCRIPTION

Figure 1B:
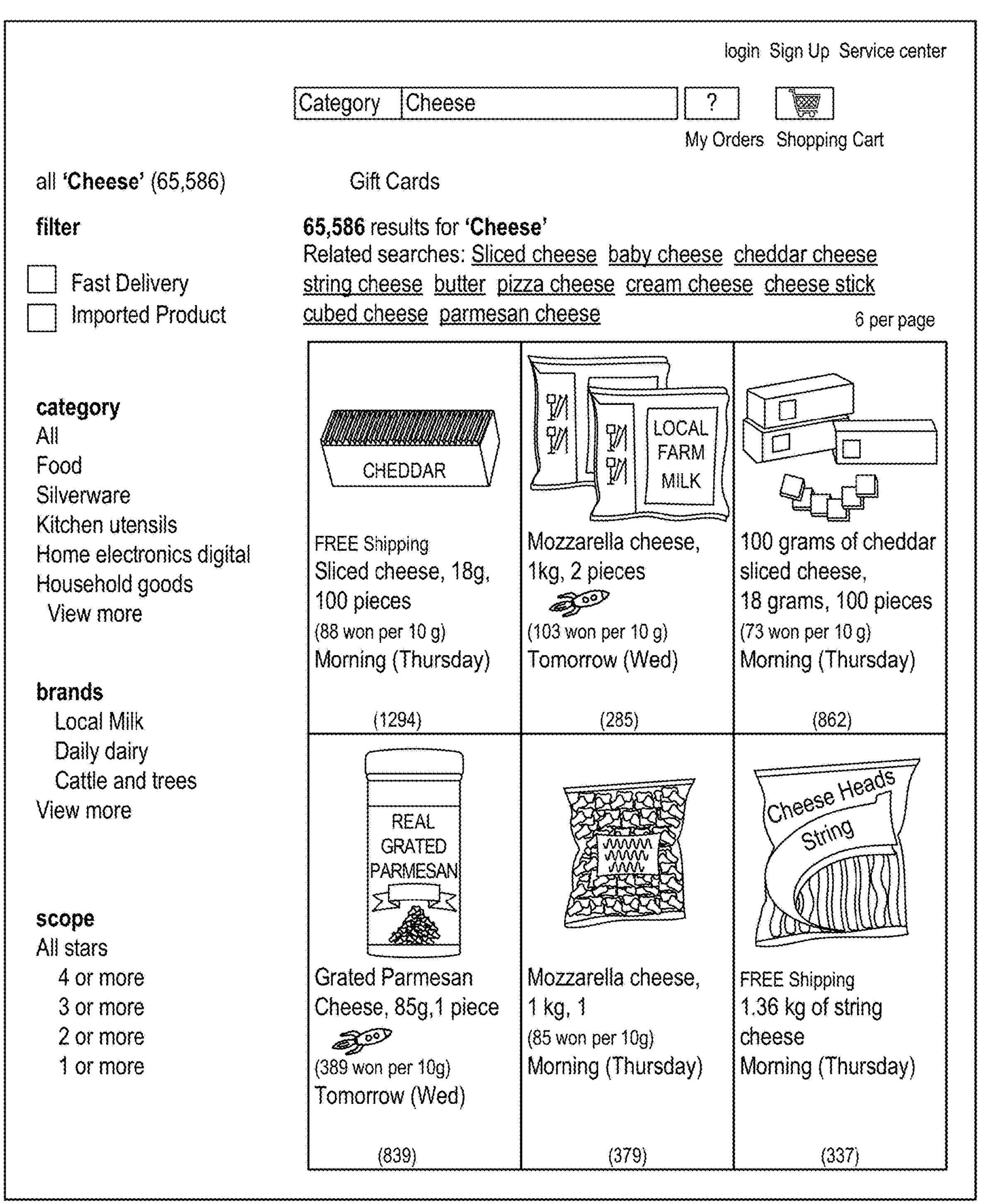
FIG. 1B depicts a sample Search Result Page (SRP) that includes one or more search results satisfying a search request along with interactive user interface elements, consistent with the disclosed embodiments.
Figure 1C:
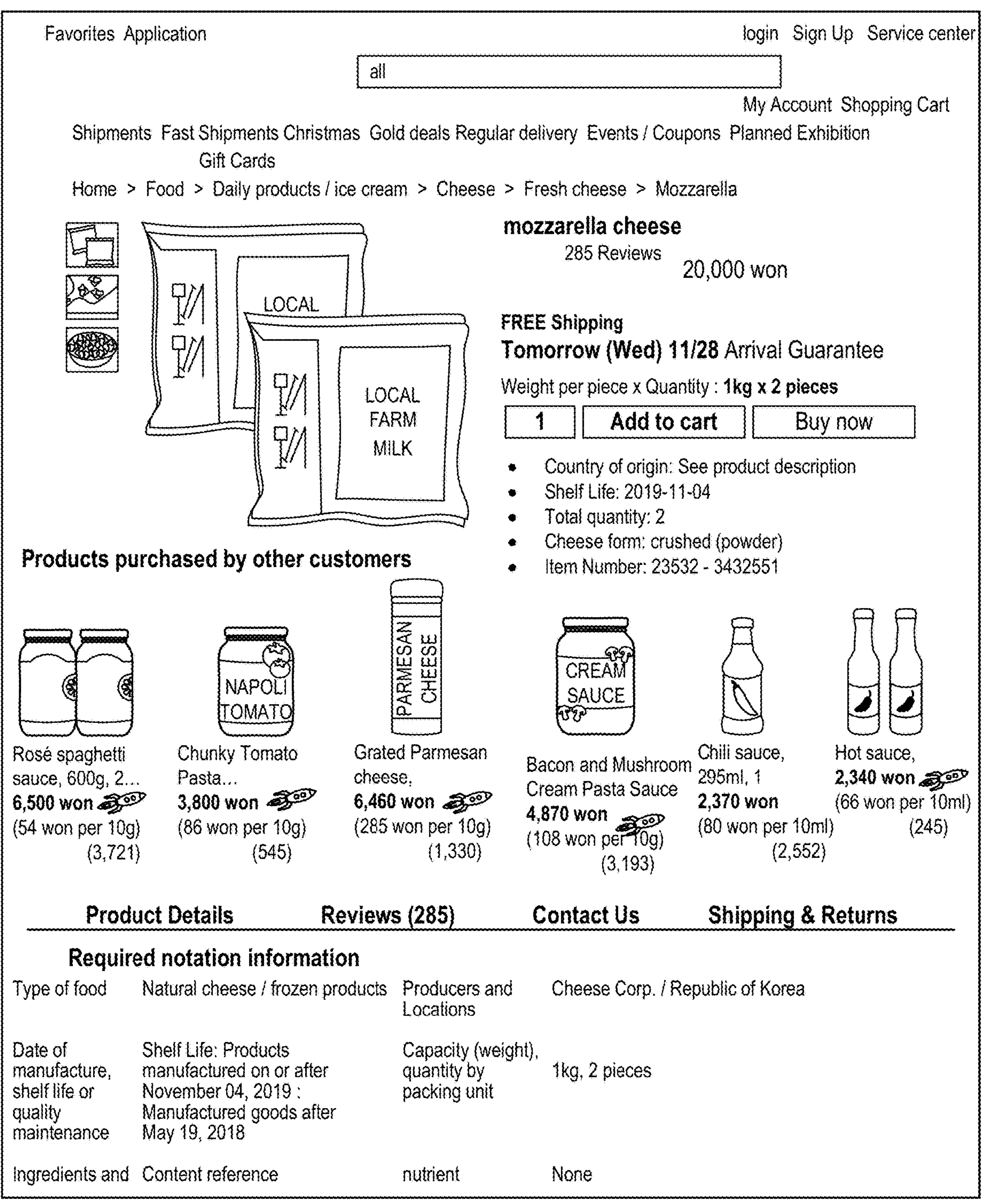
FIG. 1C depicts a sample Single Detail Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for selecting and presenting products to users based on past purchases.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 1198, and 119C (depicted as being inside of fulfillment center (FC) 200), 3rd party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
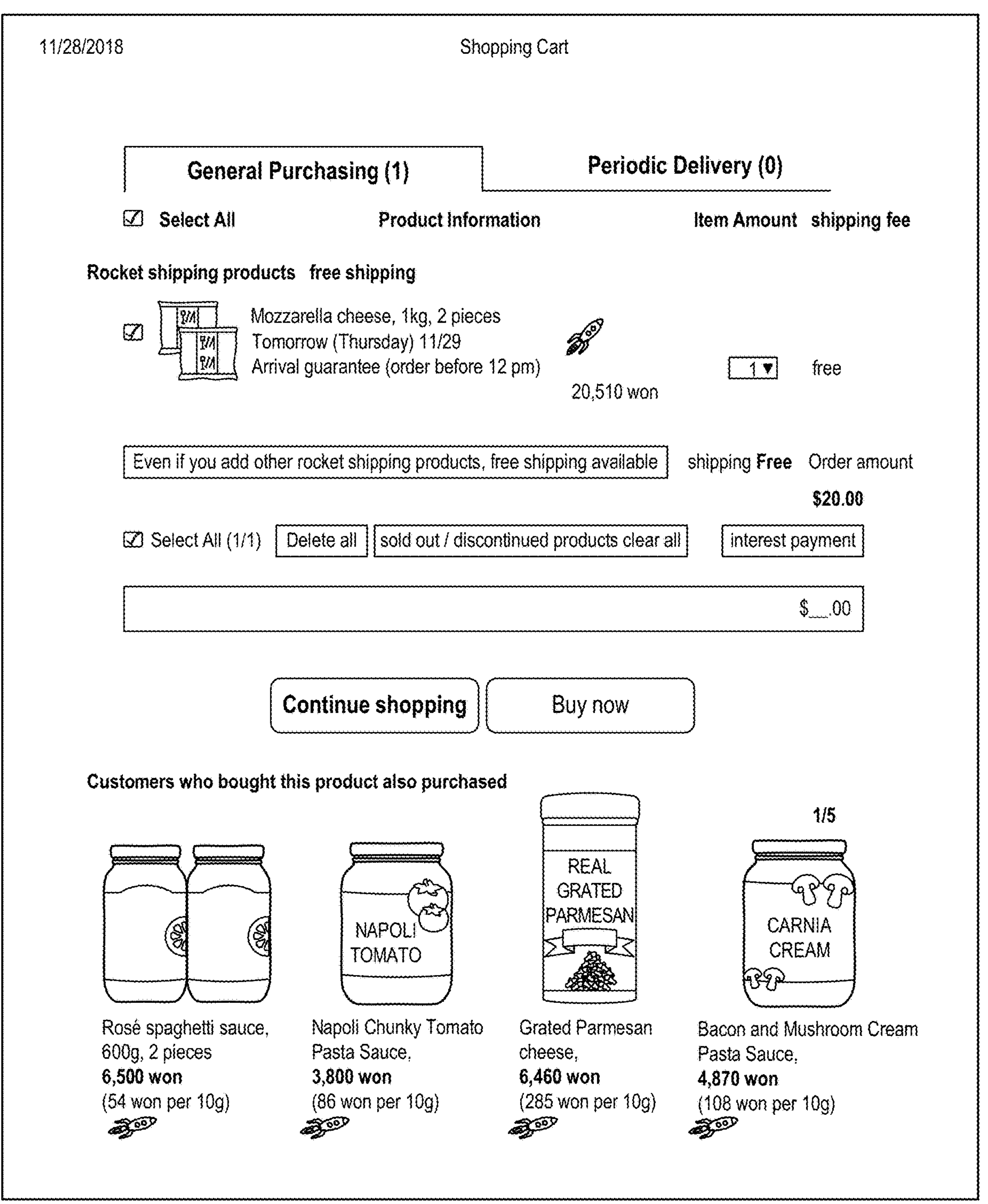
FIG. 1D depicts a sample Cart page that includes items in a virtual shopping cart along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors.

For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3$^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count of products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 1196, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
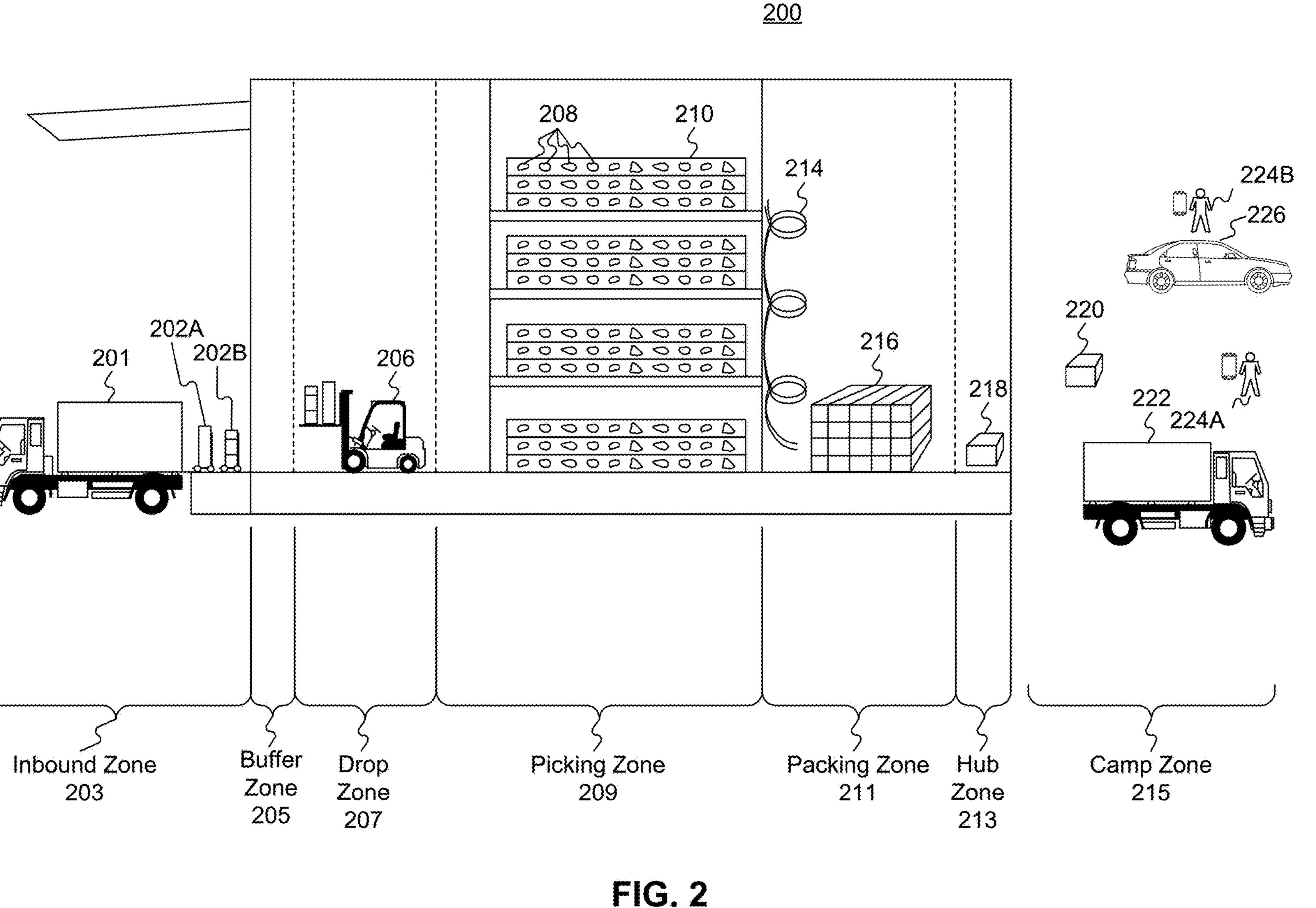
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 1196.

Once a user places an order, a picker may receive an instruction on device 1196 to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
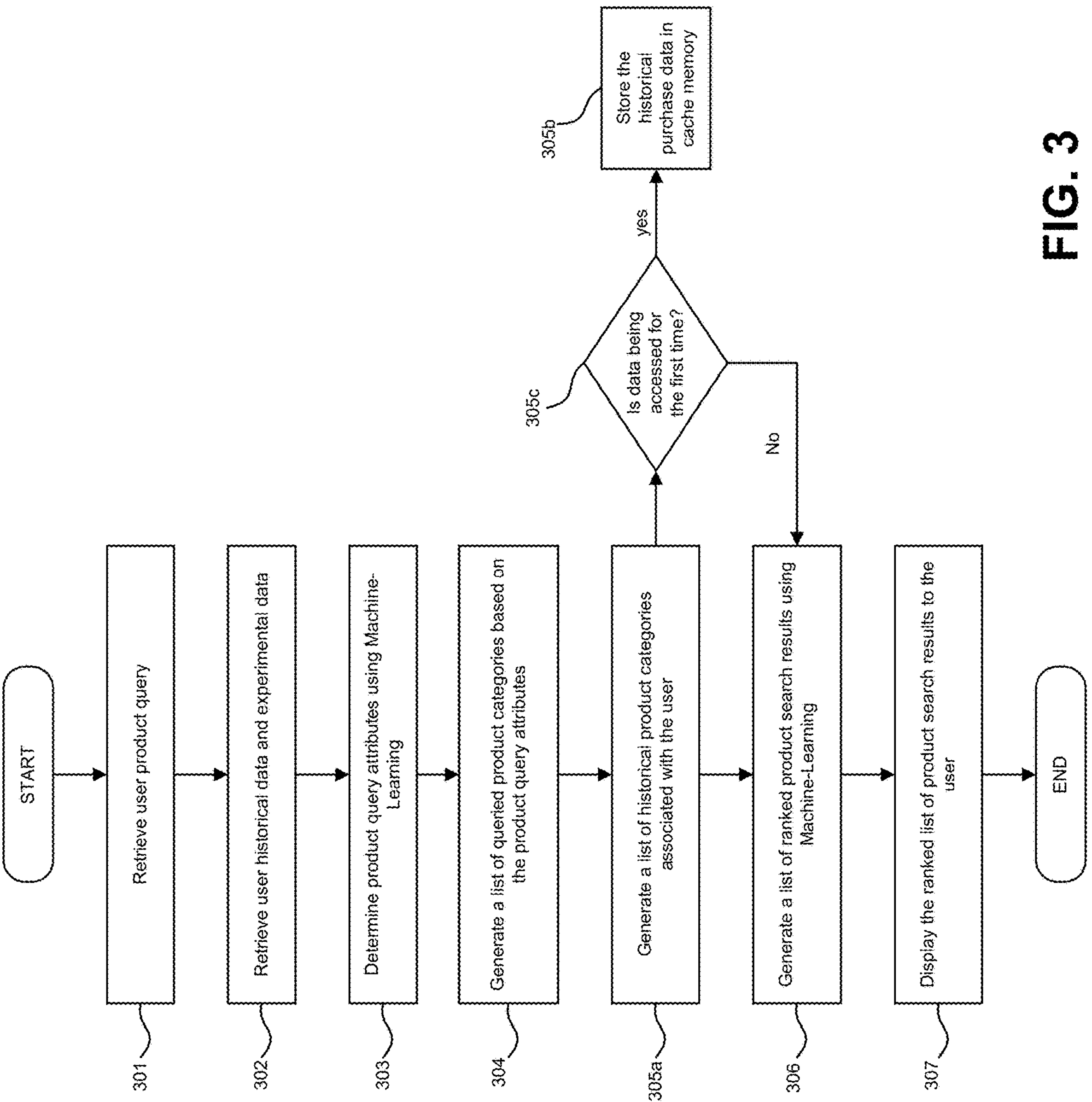
FIG. 3 is a flowchart illustrating an exemplary process for generating and presenting product search results based on a user query.

FIG. 3 illustrates an outline of the main process 300 for generating and presenting products results based on a user query for a product search. The user query data can include but is not limited to data related to a the product which the user intends to purchase. The user query data format can be but is not limited to a character strings, binary strings, numerical data, user-defined SQL Server data types, or any combination thereof. In some embodiments, the steps of FIG. 3 may be operated by external front end system 103, while in other embodiments the steps in FIG. 3 may be operated by one or more other devices in network 100, Process 300 begins at step 301 when a user inputs a search for product of intended purchase into an external front end system 103 associated with a front end device (e.g. mobile device 102A or computer 102B). One or more processors (e.g. purchase processor 404 in FIG. 4) retrieves the user query associated with a product search from the external front end system 103 associated with the front end device (e.g. mobile device 102A or computer 102B. In some embodiments, the user query may be from a web page where a user inputs information into a form, e.g. as in FIG. 1B, or an upload where customer data is uploaded to store to the database.

Process 300 then proceeds to step 302. In step 302, one or more processors (e.g. processor 404) retrieves at least one set of historical purchase data associated with the user from at least one data structure stored in one or more databases (e.g. Purchases database 405 as in FIG. 4). The user historical purchase data can include but is not limited to all the past purchases made by the user delimited by product types, purchase transaction types, or a predefined time frame. The historical purchase data can be stored in linear data structures including but not limited to tables, arrays, linked lists, or non-linear data structures including but not limited to graph data structures or tree data structures. The type of database can comprise of but is not limited to MySQL databases or NoSQL databases such as Cassandra.

Also in step 302, the one or more processors (e.g. processor 404) retrieve at least one set of experimental data from at least one data structure The source of the set of experimental data can consist of but is not limited to aggregated data across all users or a subset of all users associated with past product purchases. The experimental data can include but is not limited to a hierarchically-structured set of product categories, ranging from broad categories (e.g. "Household", or "Dental") to more granular categories (e.g. "Toothpaste", "Whitening Toothpaste").

Process 300 then proceeds to step 303. In step 303, the one or more processors (e.g. processor 404) may perform standardization or normalization of the user query using natural language processing techniques. The natural language processing techniques may comprise but is not limited to text tokenization, stemming, and lemmatization. For example, the processor may normalize a user query consists of "tooth-paste" or "tooth paste" into the standardized form of "toothpaste" in order to facilitate database search. The one or more processor analyzes the normalized user query and extracts at least one set of attributes and one pattern associated with the user query using at least one machine learning model. The machine learning model is based on at least one machine learning algorithm. The machine-learning algorithm may include, for example, Viterbi algorithms, Naïve Bayes algorithms, neural networks, etc. and/or joint dimensionality reduction techniques (e.g., cluster canonical correlation analysis, partial least squares, bilinear models, cross-modal factor analysis) configured to observe relationships between user query input data and attributes and patterns associated with products and generate a set of attributes and at least one pattern associated with the intended product of purchase according to the observations. The at least one machine-learning algorithm may be trained, for example, using a supervised learning method (e.g., gradient descent or stochastic gradient descent optimization methods). In some embodiments, one or more machine learning algorithms may be configured to generate an initial set of product attributes, based on associations between classifications, that may be validated using custom knowledge.

In step 303, the set of attributes may include but is not limited to the brand name of the product which the user intends to search through the search query input (e.g. "Colgate"). The set of attributes may also include but is not limited to a description of the product (e.g. "4.8 oz whitening toothpaste") or a quantity (e.g. "4-pack"), or a product number (e.g. "35000-30000A") or any combination thereof. The at least one pattern based on the set of attributes may be a pattern that is associated with the intended product of purchase by the user based on the set of product attributes (e.g. "Colgate whitening toothpaste").

Process 300 then proceeds to step 304. In step 304, the one or more processors may determine at least one set of queried product categories based on the attributes and at least one pattern of the queried product which the user intended to search for using at least one machine learning model and the experimental data. The machine learning model is based on at least one machine learning algorithm. The machine-learning algorithm may include, for example, Viterbi algorithms, Naïve Bayes algorithms, neural networks, etc. and/or joint dimensionality reduction techniques (e.g., cluster canonical correlation analysis, partial least squares, bilinear models, cross-modal factor analysis) configured to observe relationships between the attributes and patterns associated with the queried product and the hierarchical product categories based on the experimental data and generate a set of product categories associated with the intended product of purchase according to the observations. The at least one machine-learning algorithm may be trained, for example, using a supervised learning method (e.g., gradient descent or stochastic gradient descent optimization methods). In some embodiments, one or more machine learning algorithms may be configured to generate an initial set of product categories, based on associations between classifications, that may be validated using custom knowledge. For example, if the queried product is determined to be "Colgate toothpaste", then the set of queried product categories can include, but is limited to, "Household→Dental→Toothpaste".

Process 300 then proceeds to step 305*a*. In step 305*a*, the one or more processors determine at least one set of historical product categories associated with the user based on the user's historical purchase data and the experimental data, using machine learning algorithms. The machine-learning algorithm may include, for example, Viterbi algorithms, Naïve Bayes algorithms, neural networks, etc. and/or joint dimensionality reduction techniques (e.g., cluster canonical correlation analysis, partial least squares, bilinear models, cross-modal factor analysis) configured to observe relationships between the user historical purchase data and the hierarchical product categories based on the experimental data and generate a set of historical product categories associated with the user according to the observations. The at least one machine-learning algorithm may be trained, for example, using a supervised learning method (e.g., gradient descent or stochastic gradient descent optimization methods). In some embodiments, one or more machine learning algorithms may be configured to generate an initial set of historical product categories, based on associations between classifications, that may be validated using custom knowledge. The set of historical product categories may consist of, but is not limited to, the set of product categories associated with the user's purchase history delimited by a product type, a purchase transaction type, or a predefined time frame. For example, if entries within the user's past purchases based on the historical purchase data include "mozzarella", "silicone-free shampoo", and "Colgate toothpaste", then the set of corresponding historical product categories may include, but is not limited to "Fresh→Refrigerated Foods→Dairy→Cheese", "Beauty→hair care products", "Household→Dental→Toothpaste".

In step 305*c*, if the user's historical purchase data is being accessed for the first time without any database records of prior access or previous storage in any data structures, then the one or processors will store the historical purchase data in cache memory (e.g. Cache 407 in FIG. 4) to facilitate any subsequent repeat access as in step 305*b*.

Process 300 then proceeds to step 306. In step 306, the one or more processors generate at least one list of product search results using machine learning techniques based on the data from at least one set of queried product categories, at least one set of user historical product categories, and the experimental data. In some embodiments, the processor(s) may match a set of queried product categories with a set of user historical product categories to determine a list of product search results. In some embodiments, the processor (s) may match a set of queried product queries with product categories within the experimental data. In some embodiments, the historical purchase data or experimental data can be stored in linear data structures including but not limited to tables, arrays, linked lists, or non-linear data structures including but not limited to graph data structures or tree data structures. In some embodiments, the historical purchase data or experimental data can be stored in databases. In some embodiments, the type of database can comprise of but is not limited to MySQL databases or NoSQL databases such as Cassandra.

The machine-learning algorithm may include, for example, Viterbi algorithms, Naïve Bayes algorithms, neural networks, etc. and/or joint dimensionality reduction techniques (e.g., cluster canonical correlation analysis, partial least squares, bilinear models, cross-modal factor analysis) configured to observe relationships among the queried product categories, the user historical product categories, and the hierarchical product categories based on the experimental data, and generate a set of product search results associated with the user query. The at least one machine-learning algorithm may be trained, for example, using a supervised learning method (e.g., gradient descent or stochastic gradient descent optimization methods). In some embodiments, one or more machine learning algorithms may be configured to generate an initial set of historical product categories, based on associations between classifications, that may be validated using custom knowledge. For example, based on the user query of "Colgate", the list of product search results may include a product under the category of "Household→Dental→Toothpaste" purchased by the user on a specific date (e.g. "1/30/21"). The one or more processor may rank the list of product search results based on at least one relevancy metric. In some embodiments, the relevancy metric may comprise, but is not limited to, the frequency of past purchases of products by the user in the same category as the queried product of interest for purchase by the user. In some embodiments, the relevancy metric may comprise the volume of past purchases of products by the user in the same category as the queried product of intended purchase. In some embodiments, the relevancy metric may be based on the state of recency of products in the same category as the queried product of intended purchase. For example, if the one or more processor chooses to rank the list of product search results based on the frequency of past purchases, then the products which possess the highest frequency of past purchase by the user (i.e. bought most frequently by the user) would be promoted toward the top portion of the list over other products within the list. In another example, if the one or more processor chooses to rank the list of product search results based on the recency of past purchases, then the products which possess the highest frequency of past purchase and were also purchased most recently by the user would be promoted toward the top portion of the list over other products within the list.

Process 300 then proceeds to step 307. In step 307, the one or more processor (e.g. purchases processor 404) transmits the ranked product search results list to the external front end system 103. The external front end system 103 may receive information for presentation and/or display of the ranked list of product results to the user. The system 103 may present and/or display the ranked product list onto a webpage as in FIG. 1*b* or a display screen of the external device (e.g. mobile device 102A or computer 102B) for the user's perusal in order to complete the purchasing transaction. By promoting products with the highest rank based on a relevancy metric (e.g. products with the highest past purchase frequency by the user in the same category as the queried product), this system or method increases the efficiency of the user's repeat purchase experience.

Figure 4:
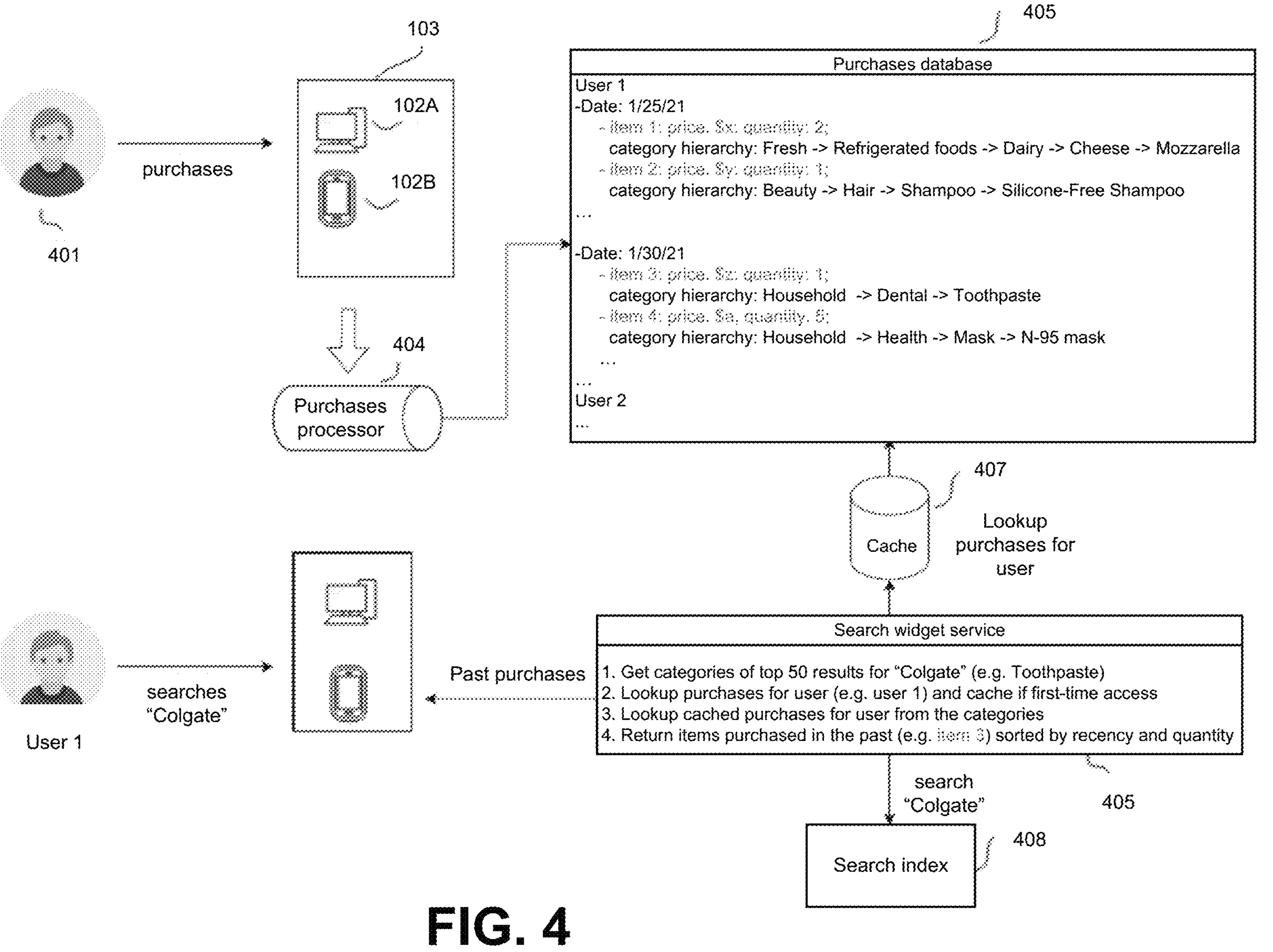
FIG. 4 is a diagrammatic illustration of an exemplary process for generating and presenting product search results based on a user's past repeat purchase history.

FIG. 4 illustrates an exemplary process of a user's repeat purchase of a previously purchased product. The user 401 initiates the purchase process via an external front end system 103 such as a mobile phone or computer (e.g. mobile device 102A or computer 102B in FIG. 1*a*). One or more processors (e.g. purchases processor 404) which may reside in system 100 retrieve the user's product query from the front end system 103. The one or more processors then retrieves, from a database, a set of historical purchase data 405 associated with the user as well as set of experimental data. Based on the user query (e.g. "Colgate"), the one or more processors generate the top number of categories associated with the queried product (e.g. the top-50 categories associated with "Colgate") using machine learning algorithms The one or more processors stores the set of historical purchase data in cache memory 407 if the data is being accessed for the first time and performs a database lookup of the historical purchase data upon subsequent access Using the historical purchase data categories, the one or more processors generates product search results based on the historical purchase product categories, the queried product categories, and the experimental data using machine algorithms. The one or more processors create a ranking of the resulting list of products based on at least one relevancy metric (e.g. frequency, recency, quantity/volume) to be presented to the user via the external front end system 103 (e.g. mobile device 102A or computer 102B as in FIG. 1*a*).

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for generating and presenting product search results based on a user query, the system comprising:
- a memory storing instructions; and
- at least one processor configured to execute the instructions to perform operations comprising:
  - receiving, via a graphical user interface, a product search query by a user;
  - retrieving, from at least one data structure:
    - at least one set of historical purchase data associated with the user, and
    - at least one set of experimental data comprising at least one hierarchical list of product categories, wherein the experimental data is generated based on receiving the product search query;
  - normalizing the product search query, using a natural language processing technique comprising text tokenization, stemming, or lemmatization, to generate a normalized user query;
  - extracting, using at least one machine-learning algorithm and based on an analysis of the normalized user query:
    - a plurality of attributes associated with the product search query, and
    - at least one pattern associated with the product search query;
  - generating, using at least one machine-learning algorithm, a list of queried product categories based on the normalized user query, wherein the at least one machine-learning algorithm is configured to observe relationships between the plurality of attributes and the at least one pattern and to generate the list of queried product categories based on observed associations;
  - generating, using the at least one set of historical purchase data and the at least one set of experimental data, a hierarchical list of historical product categories associated with the user;
  - generating a list of product search results associated with the product search query, based on the list of queried product categories and the hierarchical list of historical product categories;
  - ranking, using at least one machine-learning algorithm, the list of product search results based on a relevancy metric to the product search query;
  - displaying the ranked list of product search results to the user via user interface elements, the user interface elements enabling the user to add one or more presented products to a virtual shopping cart, or to request a single detail page based on a particular presented product, the single detail page including recommendations for similar products based on an analysis of customers who bought the particular presented product and at least one other product; and
  - displaying the list of queried product categories or the hierarchical list of historical product categories alongside the ranked list of product search results.

2. The system of claim 1, wherein the at least one set of experimental data comprises a hierarchical list of products and product categories based on aggregated data from a plurality of users.

3. The system of claim 1, wherein the plurality of attributes associated with the product search query comprises at least a product name.

4. The system of claim 1, wherein the plurality of attributes associated with the product search query further comprises a price and a quantity.

5. The processor of claim 1, further comprising:
- determining a history of prior access by the system for the historical purchase data associated with the user, and, upon determining that there is no history of prior access, storing the historical purchase data associated with the user in a cache memory.

6. The system of claim 1, wherein the list of queried product categories comprises at least one product category.

7. The system of claim 1, wherein the hierarchical list of historical product categories associated with the user is further ranked by a past purchase frequency of items within each category.

8. The system of claim 1, wherein the relevancy metric between the product search results and the user's product search query is at least based on past purchase volume.

9. The system of claim 1, wherein the relevancy metric between the product search results and the product search query is at least based on state of recency.

10. The system of claim 1, wherein an order of displaying the product search results to the user is based on the ranking of each product search result.

11. A computer-implemented method for generating and presenting product search results based on a user query, comprising:

receiving, via a graphical user interface, a product search query by a user;

retrieving, from at least one data structure:

at least one set of historical purchase data associated with the user, and at least one set of experimental data comprising at least one hierarchical list of product categories, wherein the experimental data is generated based on receiving the product search query;

normalizing the product search query, using a natural language processing technique comprising text tokenization, stemming, or lemmatization, to generate a normalized user query;

extracting, using at least one machine-learning algorithm and based on an analysis of the normalized user query:

a plurality of attributes associated with the product search query, and at least one pattern associated with the product search query;

determining, using at least one machine-learning algorithm, a list of queried product categories based on the normalized user query, wherein the at least one machine-learning algorithm is configured to observe relationships between the plurality of attributes and the at least one pattern and to generate the list of queried product categories based on observed associations;

generating, using the at least one set of historical purchase data and the at least one set of experimental data, a hierarchical list of historical product categories associated with the user;

generating a list of product search results associated with the product search query, based on the list of queried product categories and the hierarchical list of historical product categories;

ranking, using at least one machine-learning algorithm, the list of product search results based on a relevancy metric to the product search query;

displaying the ranked list of product search results to the user via user interface elements, the user interface elements enabling the user to add one or more presented products to a virtual shopping cart, or to request a single detail page based on a particular presented product, the single detail page including recommendations for similar products based on an analysis of customers who bought the particular presented product and at least one other product; and displaying the list of queried product categories or the hierarchical list of historical product categories alongside the ranked list of product search results.

12. The method of claim 11, wherein the at least one set of experimental data comprises a hierarchical list of products and product categories based on aggregated data from a plurality of users.

13. The method of claim 11, wherein the plurality of attributes associated with the product search query comprises at least a product name.

14. The method of claim 11, wherein the plurality of attributes associated with the product search query further comprises a price and a quantity.

15. The method of claim 11, further comprising:

determining a history of prior access by the system for the historical purchase data associated with the user, and, upon determining that there is no history of prior access, storing the historical purchase data associated with the user in a cache memory.

16. The method of claim 11, wherein the list of queried product categories comprises at least one product category.

17. The method of claim 11, wherein the hierarchical list of historical product categories associated with the user is further ranked by a past purchase frequency of items within each category.

18. The method of claim 11, wherein the relevancy metric between the product search results and the product search query is at least based on past purchase volume.

19. The method of claim 11, wherein the relevancy metric between the product search results and the product search query is at least based on state of recency.

20. A computer-implemented system for generating and presenting product search results based on a user query, the system comprising:

a memory storing instructions; and at least one processor configured to execute the instructions to perform operations comprising:

receiving, via a graphical user interface, a product search query by a user, the product search query comprising a text string;

retrieving, from at least one data structure:

at least one set of historical purchase data associated with the user, and at least one set of experimental data comprising at least one hierarchical list of product categories collected from an aggregated set of users, wherein the experimental data is generated based on receiving the product search query;

determining a history of prior access by the system for the historical purchase data associated with the user, and, upon determining that there is no history of prior access, storing the historical purchase data associated with the user in a cache memory;

normalizing the product search query, using a natural language processing technique comprising text tokenization, stemming, or lemmatization, to generate a normalized user query;

extracting, using at least one machine-learning algorithm and based on an analysis of the normalized user query:

a plurality of attributes associated with the product search query comprising at least a product name, a price, and a quantity, and at least one pattern associated with the product search query;

generating, using at least one machine-learning algorithm, a list of queried product categories based on the normalized user query, wherein the at least one machine-learning algorithm is configured to observe relationships between the plurality of attributes and the at least one pattern and to generate the list of queried product categories based on observed associations;

generating, using the at least one set of historical purchase data and the at least one set of experimental data, a hierarchical list of historical product categories associated with the user;

ranking the hierarchical list of historical product categories based on a past purchase frequency of items within each category;

generating a list of product search results associated with the product search query, based on the list of queried product categories and the hierarchical list of historical product categories;

ranking, using at least one machine-learning algorithm, the list of product search results based on a relevancy metric to the product search query, wherein the relevancy metric is at least based on past purchase frequency or state of recency;

displaying the ranked list of product search results to the user via user interface elements, the user interface elements enabling the user to add one or more presented products to a virtual shopping cart, or to request a single detail page based on a particular presented product, the single detail page including recommendations for similar products based on an analysis of customers who bought the particular presented product and at least one other product; and displaying the list of queried product categories or the hierarchical list of historical product categories alongside the ranked list of product search results.

* * * * *